US005702659A

United States Patent [19]

Kragle et al.

[11] Patent Number: 5,702,659

[45] Date of Patent: Dec. 30, 1997

[54] HONEYCOMB EXTRUSION DIE AND METHODS

[75] Inventors: Harry A. Kragle, Corning; Floyd E. Stumpff; David R. Treacy, Jr., both of Elmira, all of N.Y.

[73] Assignee: Corning Incorporated, Corning, N.Y.

[21] Appl. No.: 565,734

[22] Filed: Nov. 30, 1995

[51] Int. Cl.$^6$ .................................................... B29C 47/12

[52] U.S. Cl. ................ 264/177.11; 29/418; 264/177.12; 264/211.11; 425/461; 425/463

[58] Field of Search ......................... 264/211.11, 177.11, 264/177.12; 425/461, 467, 463, 464; 29/418

[56] References Cited

U.S. PATENT DOCUMENTS

| | | | |
|---|---|---|---|
| Re. 34,624 | 5/1994 | Cunningham | 264/177.12 |
| 3,790,654 | 2/1974 | Bagley . | |
| 3,846,197 | 11/1974 | Wiley . | |
| 3,905,743 | 9/1975 | Bagley . | |
| 3,923,444 | 12/1975 | Esper et al. | 425/461 |
| 4,118,456 | 10/1978 | Blanding et al. . | |
| 4,242,075 | 12/1980 | Higuchi et al. . | |
| 4,243,370 | 1/1981 | Higuchi et al. . | |
| 4,298,564 | 11/1981 | Higuchi et al. . | |
| 4,321,025 | 3/1982 | Cunningham . | |
| 4,354,820 | 10/1982 | Yamamoto et al. | 264/177.12 |
| 4,373,895 | 2/1983 | Yamamoto et al. | 264/177.12 |
| 4,465,454 | 8/1984 | Duerr et al. . | |
| 4,468,365 | 8/1984 | Corbett et al. | 425/461 |
| 4,731,010 | 3/1988 | Cunningham | 264/177.12 |
| 4,846,657 | 7/1989 | Chao | 264/177.12 |
| 4,883,420 | 11/1989 | Ozaki et al. | 425/464 |
| 5,066,215 | 11/1991 | Peters et al. . | |
| 5,108,685 | 4/1992 | Kragle | 264/177.12 |
| 5,238,386 | 8/1993 | Cunningham et al. | 264/177.12 |

FOREIGN PATENT DOCUMENTS

| | | | |
|---|---|---|---|
| 52-8761 | 12/1975 | Japan . | |
| 52-8762 | 12/1975 | Japan . | |
| 62-94320 | 4/1987 | Japan | 425/464 |
| 62-236710 | 10/1987 | Japan | 425/461 |
| 5-131426 | 5/1993 | Japan | 264/177.12 |

*Primary Examiner*—Jeffery R. Thurlow
*Attorney, Agent, or Firm*—Kees van der Steere

[57] ABSTRACT

A honeycomb extrusion die including a feed section having a plurality of feedholes for the input of an extrudable material, a discharge section including a discharge opening for discharging the extrudable material as a channeled honeycomb body, and a multilayer transition section disposed between the feed section and the discharge section for conveying and conditioning the extrudable material from the feed to the discharge sections, is disclosed. Also disclosed are methods for making and using the die.

42 Claims, 6 Drawing Sheets

HONEYCOMB EXTRUSION DIE AND METHODS

BACKGROUND OF THE INVENTION

The present invention relates to improved dies for the extrusion of honeycomb structures from plasticized organic or inorganic batch materials. More particularly, the invention relates to a honeycomb extrusion die incorporating a laminated transition section for improved die performance and service life, and methods for making and using that die.

The use of extrusion dies to form thin-walled honeycomb structures is well known. U.S. Pat. Nos. 3,790,654 and 3,905,743 to Bagley describe one design for such a die, that design incorporating a plurality of feedholes entering an inlet face of the die and extending through the body of the die to convey extrudable material to a discharge section formed on the die outlet surface by an array of discharge slots. The discharge slots interconnect with each other, reforming the extrudable material into an interconnecting wall structure for a channeled honeycomb body in the course of discharge from the outlet face of the die.

As the uses for such honeycomb structures have increased, so also has the need for extrusion dies capable of forming more finely structured honeycombs. A fundamental limitation of these dies, however, is the fact that neither the feedholes nor the discharge slots may be multiplied without limit, since the extrusion pressures used for plasticized powder extrusion require substantial stiffness or toughness in the die to avoid die distortion or breakage.

One approach for alleviating this difficulty is the so-called compound feed die design. In that design the inlet portion of the die is made up of two or more drilled plates, with a thick, rigid, first or batch inlet plate incorporating relatively large feedholes which supply extrudable batch to a second or inner plate incorporating a finer feedhole array. The inner plate passes the batch material to the discharge slots on the outlet face of the die. U.S. Pat. Nos. 4,118,456 and 4,321,025 describe dies of this type, while U.S. Pat. No. 4,465,454 discloses the use of an overlapping arrangement of the two sizes of feedholes to avoid flow restriction in the interior of the dies.

Variations on the compound feed die include that of U.S. Pat. No. 4,243,370, wherein guide channels for directing extrudable material into the discharge section of the die are provided. U.S. Pat. No. 4,298,564 describes a similar die configuration wherein a combination of guide grooves and flow restrictors is used to improve the distribution of the extrudable material at the discharge face of the die.

Die development has also focused on ways for obtaining a more uniform flow and proper distribution of the extrudable material to the outlet face of the die. For example, Published Japanese Utility Model applications 52-8761 and 52-8762 disclose discrete channels for the distribution of feed streams directly to slot locations on the outlet face, while U.S. Pat. No. 4,242,075 describes a die construction with feed material distribution channels feeding an array of spoke-supported cell blocks for forming the cells in the extruded honeycomb.

The art has long recognized the desirability of smoothing the feed channels in an extrusion die to reduce back pressure and to reduce abrasive wear on the die caused by the inorganic powder mixtures being extruded. U.S. Pat. No. 5,066,215 describes a die wherein the feedholes uniformly taper to discharge slots on the die outlet surface. U.S. Pat. No. 3,846,197 discloses a similar gradual transitioning of feedholes and discharge slots, the die in that case being assembled through the stacking of a large number of glass plates. Each of the plates is at least partially etched to provide the desired feedhole or discharge slot array, and the die body is then assembled by stacking the etched plates and heating them to fuse the glass layers into an integral assembly.

Notwithstanding the foregoing developments, current methods of fabricating extrusion dies continue to rely on the drilling of feedholes into one face of a metal die body, while cutting discharge slots into the opposite face. Disadvantageously, the machining methods currently used to produce honeycomb extrusion dies use traditional rotating or straight line tooling. Even electro-chemical machining and wire-electrical discharge machining are largely incapable of providing complicated contours within the interiors of these dies.

As evident from a study of this fabrication art, the depths of the feedholes and discharge slots are typically closely controlled to create a desired amount of overlap for proper distribution of an extrudable batch material to the slots on the discharge face. However, since the region of feedhole/slot overlap formed by this method is created within the inaccessible interior of the die, it rarely, if ever, produces an efficient flow path. To the contrary, examinations of the interiors of dies used for ceramics extrusion consistently indicate that powdered batch materials do not find the overlap region to be particularly streamlined, but instead tend to wear the die interior into a modified and relatively complex configuration apparently more conducive to efficient batch flow.

The problem of smoothly conveying a batch material from a feedhole inlet to a discharge slot outlet can be better appreciated when it is recognized that batch flow is longitudinal through the feedhole section of the die, but rapidly transitions to a combination of lateral and longitudinal flow at the feedhole/discharge slot interface. Rapid lateral flow at these junctions is required to adequately fill the discharge slot array, but if the flow is non-uniform, defects such as marginal cell wall knitting, wavy or swollen cell walls, missing cell walls, and plugged cells will appear in the extruded product.

In light of these continuing difficulties, it is a principal object of the present invention to provide an extrusion die which more effectively addresses many of the problems presented by conventionally machined extrusion dies.

It is a further object of the invention to provide an extrusion method utilizing an improved die which provides extruded honeycombs of improved shape and quality at reduced extrusion pressures.

Other objects and advantages of the invention will become apparent from the following description thereof.

SUMMARY OF THE INVENTION

In accordance with the present invention, the problem of material flow control at the feedhole/slot interface of a honeycomb extrusion die is addressed by fashioning the interface from a stack of thin plates. Each plate in the stack will contain multiple openings representing a very thin cross section of the desired flow channel within the die at that point.

This approach advantageously permits each successive plate in the stack to have its own unique geometry. Typically this geometry will be fractionally different from that of neighboring plates in the stack, to achieve a flow change which is desired. Alternatively, two or more plates in succession may be of the same hole geometry, for purposes of feed stream equilibration or for other purposes. Among the flow changes which can be effected in flow streams of extrudable material by a multilayer interface of this type are the subdivision or compounding of the flow streams, changes in flow direction, changes in the shape of the flow streams, and increases or decreases in flow velocity. The latter typically result from compression or expansion of the flow streams.

In many cases these flow parameters can be independently varied; in other cases they will be interdependent. In any case the capability of compounding or subdividing the feed streams from each of the feedholes to provide multiple sub-streams is of particular importance because such compounding can insure a wide but accurate redistribution of the extrudable material from a relatively small number of feedholes. Thus the flow pattern of material to be supplied to any arbitrarily selected discharge slot configuration or array can be optimized without the need to increase the number of feedholes in the inlet or feed portion of the die.

In a first aspect, then, the invention includes a honeycomb extrusion die comprising a feed section, a discharge section, and a multilayered transition section. The feed section includes a plurality of feedholes for the input of extrudable material, while the discharge section, terminating on a discharge face for the die, comprises a discharge opening for discharging the extrudable material as a channeled honeycomb body. The multilayered transition section, which is disposed between the feed section and the discharge section, comprises a stacked plurality of thin transition layers.

Each of the thin layers in the transition section incorporates a plurality of openings, those openings being in at least partial registry with openings in adjoining thin layers or connecting die sections. Thus the layers provide successions of openings which align to form continuous transitioning conduits for transporting extrudable material from the feedholes to the discharge section of the die. Transport is in multiple feed streams, and these may be compounded (divided) and/or controlled as to size, shape and direction. In this way the large, sudden changes in flow direction and flow rate encountered in conventional dies may be avoided, and significant reductions in die impedance and/or die wear can thereby attained.

In another aspect, the invention resides in a method for extruding a honeycomb product through a die structure such as above described. In accordance with that method, an extrudable material is introduced into an array of feedholes extending into an inlet section of a honeycomb extrusion die, thus forming the material into a plurality of feed streams within the die The feed streams are then conveyed via the feedholes into a transition section of the die, disposed adjacent to and connecting with the inlet section. The transition section includes a plurality of transitioning conduits connecting with the feedholes into which the extrudable material is conveyed.

Within the transitioning conduits, the feed streams are compounded or divided, redirected, and/or reshaped to provide a plurality of divided, redirected and/or reshaped feed streams. The thus-processed feed streams are thereafter conveyed from the transitioning conduits into a discharge section of the die, adjacent to and connecting with the transition section. The discharge section comprises a discharge opening, such as an array of interconnecting discharge slots, which is configured to discharge the extrudable material as a channeled honeycomb body. From this discharge opening the extrudable material supplied to the die is finally discharged as a honeycomb product.

In particularly preferred embodiments of the invention, the extrusion die and extrusion method employ a transition section which compounds or divides each feed stream into at least two and most typically 3–16 sub-streams. Stream compounding can be carried out once, i.e., in a single stage, or it may be carried out two or more times in second or subsequent compounding stages. In the sections of the transition conduits separating the compounding layers or stages in the transition section, reshaping and redirection of the sub-streams, either in preparation for succeeding compounding stages or for delivery to the discharge section of the die, are carried out.

In yet another aspect the invention includes a method for making a honeycomb extrusion die by a lamination process. A die body plate is first selected and a plurality of feedholes is formed in the plate. Also selected is a plurality of thin plates for a die transition section, each of these plates being provided with an array of openings through which a deformable plastic or plasticized material for a honeycomb product may be extruded.

The thin transition plates thus provided are stacked to form a plate stack wherein the openings in each plate are in at least partial registry with the openings in adjacent plates in the stack. In this way, the arrays of openings combine to form an array of conduits through the plate stack.

The transition plates arranged to form the conduits are next positioned against the die body plate so that the feedholes in the body plate are in at least partial registry with the conduits, and a die discharge section is positioned against the stack of transition plates. The die discharge section may comprise an array of pins, the interstices of which comprise a discharge opening, or it may comprise a flat plate in which a discharge opening may subsequently be provided. The die body plate, transition plates, and discharge section so arranged are then bonded together to form an integral, bonded extrusion die preform.

When the die discharge section comprises a flat plate, a discharge opening communicating with the conduits in the transition section will be formed in the plate after bonding. That opening will be configured to discharge extrudable material delivered from the conduits as a channeled honeycomb body. When the discharge section is an array of pins, the pin array will be configured and positioned to enable efficient filling of pin interstices by extrudable material entering the discharge section from the conduits.

BRIEF DESCRIPTION OF DRAWINGS

The invention is further described with reference to the drawings, wherein.

DETAILED DESCRIPTION

Figure 1:
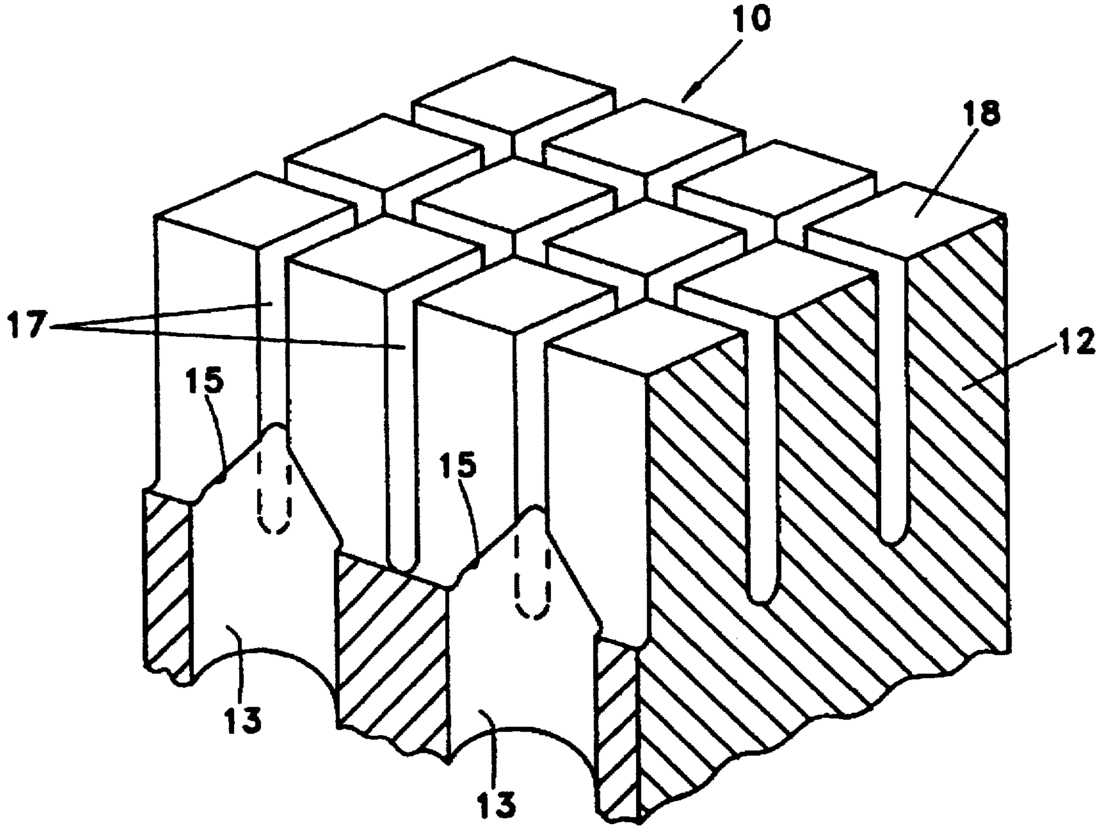
FIG. 1 (PRIOR ART)
FIG. 1 is a schematic isometric partial cross-sectional view of an extrusion die made in accordance with prior art.
Figure 2:
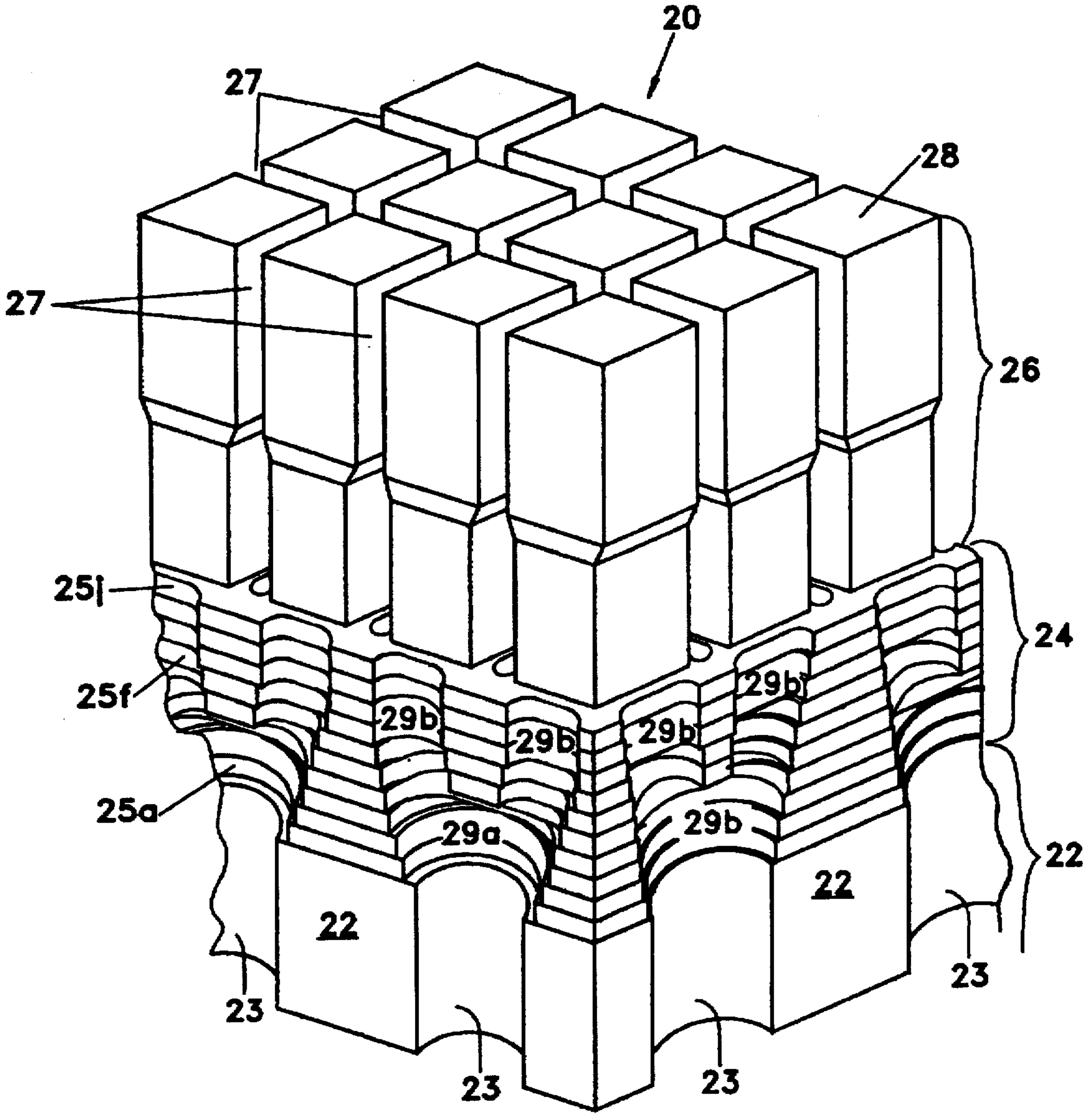
FIG. 2 is an schematic isometric partial cross-section of a die made in accordance with the invention.

A comparison of the internal structures of a conventional extrusion die and a die provided in accordance with the invention is provided in FIGS. 1 and 2 of the drawing. FIG. 1 is an enlarged schematic partial isometric view of a prior art die, not in true proportion or to scale, showing the die discharge section and a portion of the adjacent die body section of the die in elevational cross-section. The view is taken to best show the transition zone between the feedholes in the die body and the discharge slots forming the discharge opening of the die.

Referring more particularly to FIG. 1, the extrusion die shown is formed by machining a metal billet shown in part as 12. Feedholes 13 for the input of extrudable batch material to the die are first formed by drilling into the bottom face (not shown) of billet 12, and then discharge slots 17 are cut into the top surface or discharge face 18 of the billet to intersect the feedholes. Slots 17 provide discharge openings from which batch material traversing feedholes 13 may be discharged from face 18 as a honeycomb structure.

One difficulty with this die design is that the junctions or transitions represented by surfaces 15 between the feedholes 13 and the discharge slots 17 are inconsistent. That is, surfaces 15 are difficult to form with consistent smoothness and shape, and often contribute to flow disruptions which can introduce discontinuities in the walls of the extruded honeycombs.

In addition, surfaces 15 are areas of very high wear in these dies since the batch material must change direction, e.g., from a forward flow axis parallel with feedholes 13 to a combination of forward and lateral flows in discharge slots 17. Lateral flow in slots 17 is required in order that the batch material knit into a continuous honeycomb wall structure at the time it exits face 18 of the die.

FIG. 2 of the drawing provides an enlarged partial schematic isometric view, again in elevational cross-section, of a portion of an extrusion die incorporating a multilayered transition section in accordance with the invention. Die 20 in FIG. 2 is comprised of base section 22, discharge section 26, and transition section 24. The base or die body section 22 incorporates feedholes 23, while discharge section 26 includes discharge slots 27 terminating on discharge face 28.

Multilayered transition section 24 is disposed between base 22 and discharge section 26 and provides the connecting conduits **29*a*–29*b* necessary for smooth distribution and delivery of the batch material from feedholes 23 to discharge slots 27. In the particular die embodiment shown, which is intended to be illustrative rather than limiting, conduits 29*a*–29*b* are formed by the stack of thin layers or plates 25*a*–25*j*. The conduits formed by this plate stack are configured to both divide and reshape the feed streams from feedholes 23 for delivery into discharge slots 27**.

Conduit portions **29*a* commence at base transition layer 25*a* and lead away from the feedhole terminations on feedhole section 22. Divisions of the feed streams are effected as conduits 29*a* divide or branch into sub-conduits 29*b* at transition layer 25*f*. Only two of four sub-conduits 29*b* branching from each conduit 29*a*** can be seen in the view provided by FIG. 2.

Feedstream reshaping within die 20 is accomplished as sub-conduits **29*b* change in cross-sectional shape from approximately circular at the conduit division point to a rounded rectangular shape at their outlets from terminating transition layer 25*j*. Thus much of the lateral (slotwise) flow of batch material required to fill discharge slots 27 occurs prior to discharge of the batch material from sub-conduits 29*b***.

Figure 3:
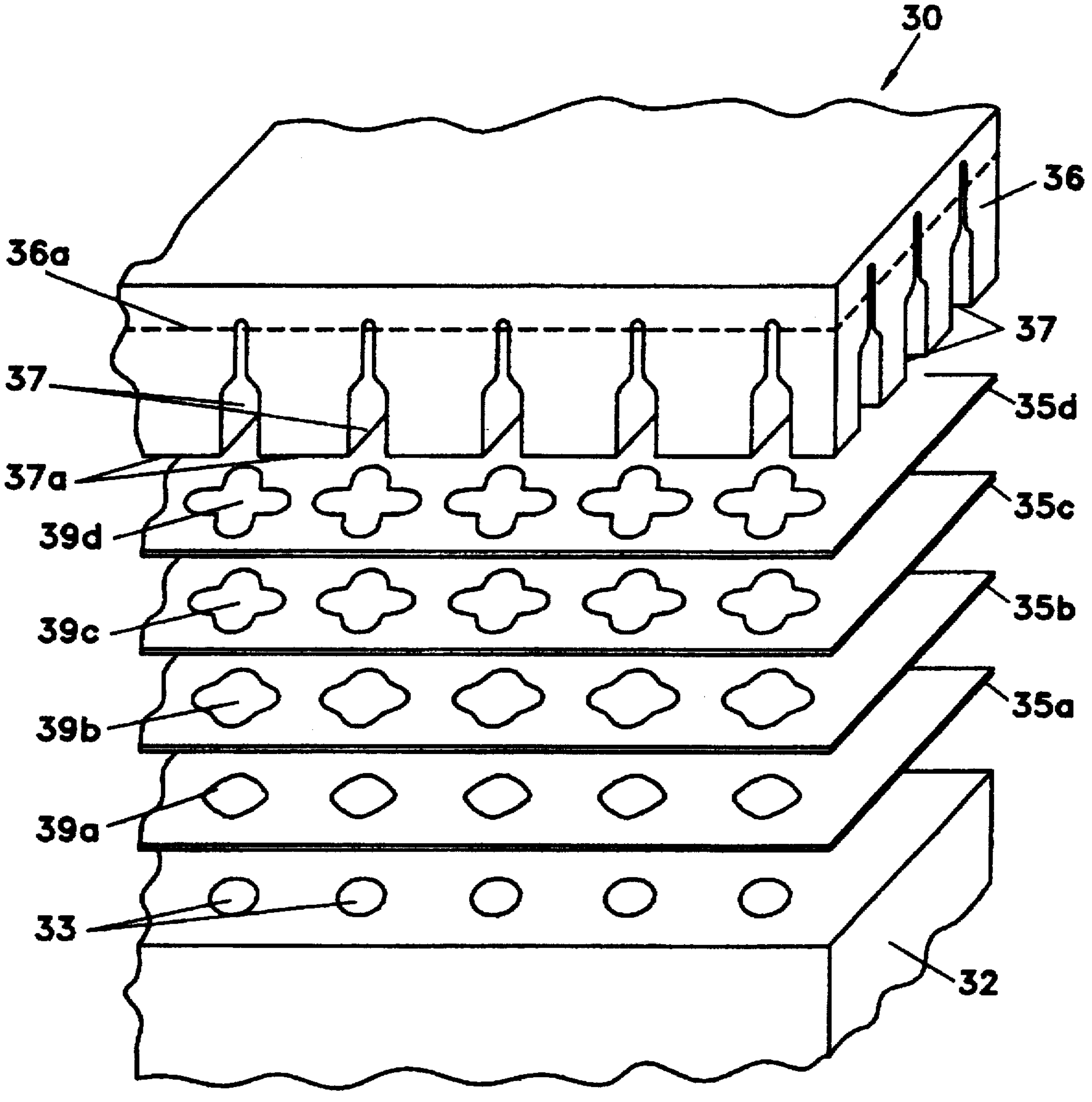
FIG. 3 is an exploded view illustrating the components and mode of assembly of a die of the invention.

FIG. 3 of the drawing is an exploded enlarged partial schematic view depicting the die components and mode of assembly of a preform for a die provided in accordance with the invention. As shown in FIG. 3, die body plate 32, which has been provided with feedholes 33, is used as a base upon which thin plates **35*a*–35*d*, comprising the layers of the transition section of the die, and discharge section 36**, are disposed.

In the component arrangement shown, illustrating the parts required for a four-layer transition section die, each of transition layers **35*a*–35*d* is provided with an array of openings 39*a*–39*d* of a predetermined cross-sectional shape. The configuration of the openings in the succession of plates is designed to modulate the shape of the conduits formed by the sheets from the circular configuration of feedholes 33 to cross-shapes more closely conforming to the intersections between criss-crossing discharge slots 37 provided in discharge section 36** of the assembly.

Referring more particularly to FIG. 3, in the array of openings **39*a* in the first or base transition layer 35*a*, the openings are close in size and shape to the circular configuration of feedholes 33 in die body 32. Openings 39*d* in the last or terminating discharge layer 35*d* are configured to supply batch feed streams having in a cross-shaped configuration to the slot intersections formed by criss-crossing slots 37**.

In the illustration shown in FIG. 3 the formation of discharge slots 37 in plate 36 has not yet been completed. Instead, discharge slots 37 extend only partially into the plate, terminating at a collective planar boundary indicated by the broken line **36*a* along the edge of plate 36. The plane indicated by line 36*a* is parallel to but spaced a distance away from the unbroken surface of plate 36** opposite the slotted plate surface.

The unslotted layer of material above line **36*a* in plate 36 serves as a supporting base or membrane for the "pins" 37*a* formed by the criss-crossing slots in the machined surface of the plate. That layer holds and maintains the alignment and spacing of pins 37*a* as the components in FIG. 3** are assembled and joined together to form a unitary die preform.

In the process of assembly and bonding of the components in FIG. 3, transition plates **35*a*–35*d* are bonded in a stack to the top surface of die body plate 32, and the ends of pins 37*a* in partially slotted plate 36 are bonded to the top transition plate in the stack. Thus a bonded assembly similar to that shown FIG. 2, except with discharge slots 37** not yet opened for discharge, is formed.

To provide the required discharge opening in this assembly, slots 37 are opened after bonding by a supplemental slotting step or, more preferably, by removing the base or membrane material above the broken line on plate 36. The latter method of die assembly forms no part of the present invention, but is described and claimed in commonly assigned patent application Ser. No. 08/565,445, "Bonded Pin Extrusion Die and Method", filed by H. Kragle et al. concurrently filed herewith.

Through the progression of transition plates **35*a*–35*d* in the die formed according to FIG. 3, significant lateral redistribution of the batch material in the transition section to fill discharge slots 37 is effected. While this redistribution does not direct the feed streams exclusively to the sides of pins 37*a*, as in FIG. 2, the die of FIG. 3 still considerably reduces the amount of lateral batch flow required in the slots. In addition, reshaping of the feed streams to conform more closely to the configuration of the slot intersections substantially reduces the amount of wear by the batch material on the corners of pins 37*a***.

In an alternative die preform fabrication method, not illustrated in FIG. 3, an unslotted face or discharge plate is substituted for plate 36 in the assembly shown. After bonding of this plate to the other components of the assembly, discharge slots or other discharge openings are formed in the exposed surface of the discharge plate by conventional sawing, slotting by electrical discharge machining (EDM), or other machining techniques. However, it is considerably more difficult to achieve optimum alignment of the preformed transition conduits with discharge slots machined after bonding than with discharge slots formed prior to bonding, because of the material creep which occurs during bonding. Therefore, for best slot alignment with the conduits in the transition section, and also to facilitate the formation of slots of complex cross-section such as shown in FIG. 3, the use of a pre-slotted faceplate for the die discharge section as shown in that figure is preferred.

Any of the known slotting methods may be used to form and/or finish slots such as slots 37 in the discharge section of a die such shown in FIG. 3. Examples of such methods include electrical discharge machining (EDM) and precision sawing. However, the presently preferred slotting method for honeycomb extrusion dies made as described is abrasive wheel grinding. Using tooling such as a small, thin borozon (cubic boron nitride) grinding wheel, abrasive wheel grinding offers particular advantages in terms of low cost, high speed and good slot sidewall finish. In addition, it is particularly suited for the formation of dual width slots 37 such as shown in FIG. 3.

In the same manner, any of the well known hole-drilling methods may be used to form the feedhole array in the body plate or feedhole section of the die. Particularly suitable methods include gun drilling and electrochemical machining (ECM) methods. Advantageously, because the body plate consists of through holes, rather than the blind holes used in conventional dies such as shown in FIG. 1, secondary operations such as honing or other hole smoothing can easily be used to improve the finish and uniformity of the feedholes, if desired.

The composition, number, and thickness of the thin plates or sheets used to form the interface section of the extrusion die of the invention will be selected to meet the demands of the particular extrusion application for which the die is intended. In general, however, it is desirable that plate thicknesses and hole patterns be selected to avoid rapid changes in conduit size, shape, or flow direction from plate to plate. The transition section in these dies may usefully be viewed as changing the direction of batch flow in a series of stair steps created by the plates in the stack. The thinner the plates used, the smaller the stair steps and thus the smoother the flow transition will be. Large directional changes are avoided by limiting hole offset from plate to plate, hole offset being measured by the angle between the centers of the holes in adjacent plates. The number of plates is selected to balance the cost of increasing plate count against the level of control desired over feed stream flow.

The array of openings in each of the thin plates used to construct the transition section of the die may be formed by conventional machining processes, but more suitably are made by photo-chemical machining methods. These well established, mature processes can produce etched orifice plates in a flexible and economical manner.

As suggested in the foregoing description, the multilayer transition dies of the invention are very effective in separating flow subdivision or shaping functions from flow stream redirection functions. That is, each of flow redirection, flow division, and/or flow reshaping can be optimally effected almost without regard for the others. For example, the initial plates in a plate stack can separate a feedhole stream into four smaller feed streams to be directed toward the four sides of a quadrilateral cell die, while at the same point or downstream from the division point the plate stack can change the shape and/or volume of each smaller flow stream as desired. Thus a circular sub-stream can be reshaped to a sub-stream with an elongated or linear cross section, to better conform to the die discharge slot which it is intended to supply.

The most efficient configuration for the transition section from the standpoint of reduced flow impedance is one wherein the flow axis for the extrudable material within the transition section does not depart from the longitudinal direction of batch flow through the feedholes and from the discharge face by an angle greater than about 30 degrees at any point along its length. Through an appropriate choice of the transitioning layers of the laminated transition section of the die, only a very few layers, for example, 5–10 layers, need to be used in order to provide an efficient redirection and/or division of the feedhole flow without exceeding this limit.

On the other hand many more layers, e.g., 10–50 or even 100 layers, could be used to "smooth" the walls of the transition section. Such smoothing can be advantageous in some cases to redirect or reshape the feed streams or sub-streams while reducing or substantially eliminating batch accumulation points or "dead spots" in the finely structured conduits.

The use of more transition layers or plates normally involves the use of thinner plates, consistent with the objective of reducing the size of the "steps" to smooth the transition conduits. However, even in low plate count dies, plate thicknesses will generally not exceed 0.020 inches (500 μm), and are more typically 0.005–0.010 inches (125–250 μm) in thickness. Plates down to 0.002 inches (50 μm), or even less, may in principle be used, particularly where tighter design tolerances and improved perpendicularity for orifice sidewalls are required despite the somewhat higher cost.

Figure 4:
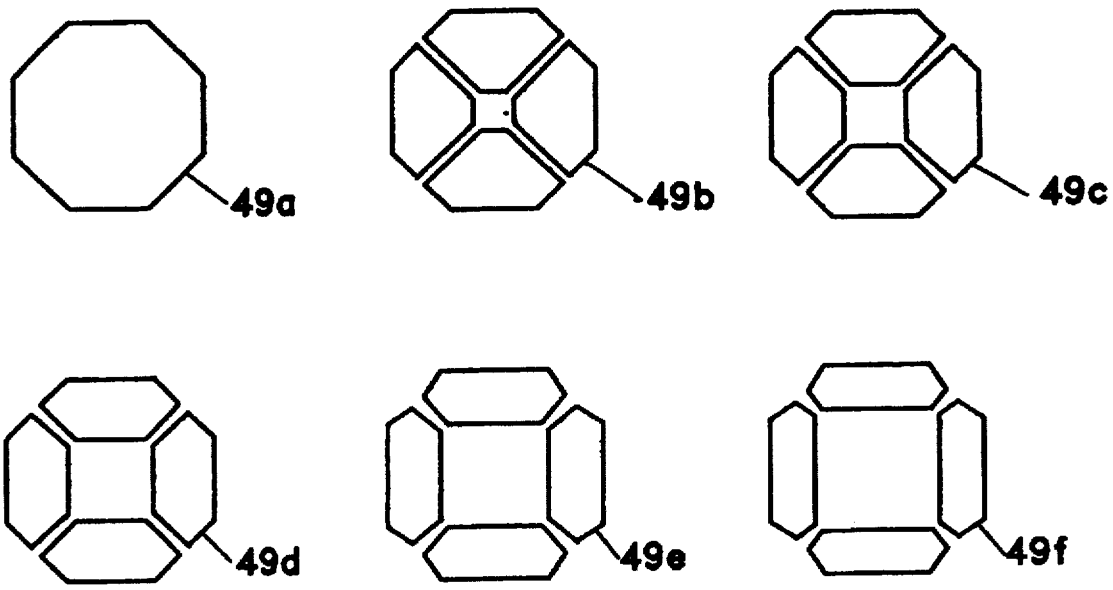
FIG. 4 illustrates a progression of predetermined shapes for the conduits to be provided in each of several transition layers for a transition section in a die of the invention.

In the conduit design of FIG. 3 the feed streams are reconfigured but not subdivided. FIG. 4 illustrates a progression of hole shapes (enlarged) for a transition conduit design, more like the design of FIG. 2, wherein the conduits both divide and reshape the feed streams.

A transition section incorporating the conduit design of FIG. 4 would comprise 6 transition layers, each succeeding layer incorporating an array of openings corresponding in shape to one of the shapes in the succession of shapes shown in FIG. 4. The layer incorporating an array of openings of shape 49(*a*) in FIG. 4 would divide each batch stream from the feedholes in an adjoining feedhole section into four sub-streams. Subsequently, the openings of shapes 49(*b*)–49 (*f*) would reshape each sub-stream into an elongate cross-section, such as would be suitable for extrusion into the base of a slot segment portion in the discharge section of a square-celled honeycomb extrusion die.

Figure 4A:
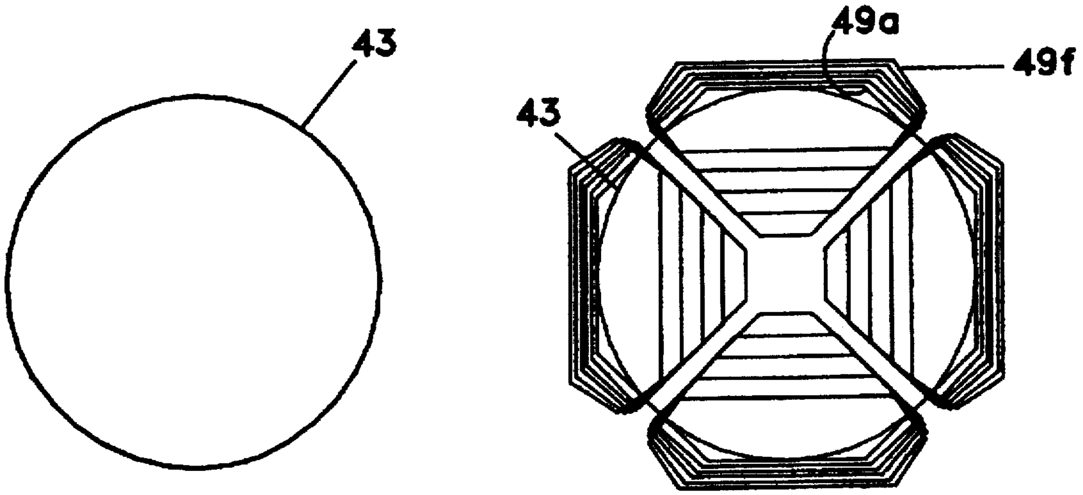
FIG. 4*a* is a schematic plan view of a transition section conduit provided by the conduit shapes of FIG. 4.

When stacked into a multilayer transition section, layers having the hole shapes of FIG. 4 would form a conduit such as schematically shown in the enlarged plan view of FIG. 4*a*. FIG. 4*a* compares the size and shape 43 of a feedhole opening in a die base plate with the openings in a stack of superimposed transition layers shaped as shown in FIG. 4.

The shape comparison presented in FIG. 4*a* illustrates the way in which, with the transition layers openings in proper registry, the superimposing hole shapes of FIG. 4 would provide conduits progressing from shape 49*a* (closely matching feedhole 43 in both shape and size) to elongated shape 49(*f*) (approximating a discharge slot segment in shape and size). Also suggested is the angling of the divided conduits away from the flow axis of feedhole 43, the latter being perpendicular to the plane of the drawing. The angles between the flow axis of the feedhole and those of the conduits can be computed from the thickness of the transition layers and the shifts in opening locations from each transition layer to the next.

Figure 5:
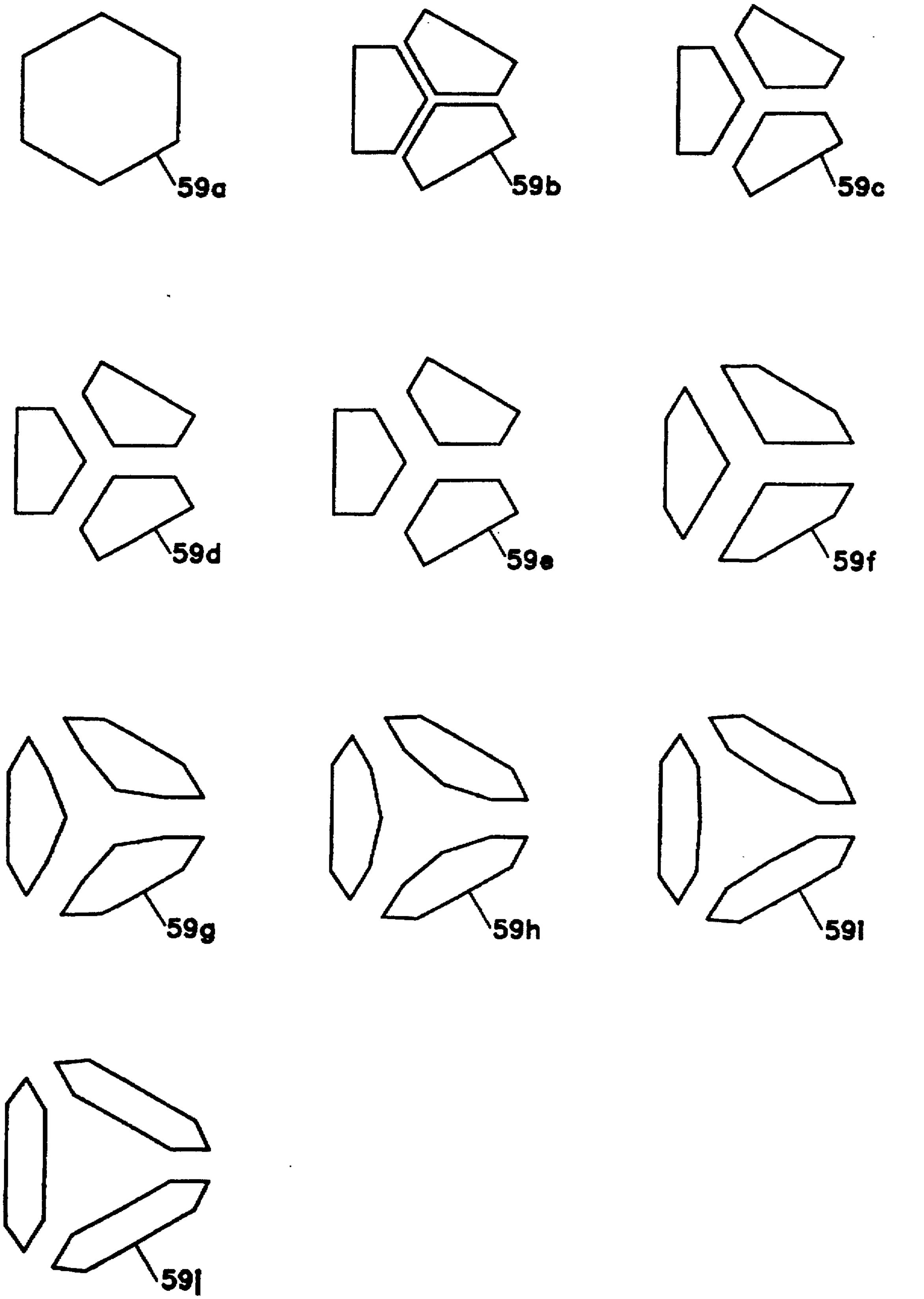
FIG. 5 illustrates an alternative progression of shapes for the conduits to be provided in a progression of transition layers for a die of the invention.

A transition section design for an extrusion die for triangular-cell honeycomb extrusion is shown in FIG. 5 of the drawing. The progression of shapes in that figure is designed to provide a conduit for dividing, reshaping, and redirecting a single circularly shaped feedstream into three elongated feed streams supplying extrudable material evenly about a triangular "pin" in the discharge face of such a die. As seen in this design, subdivision of each feedhole feedstream occurs in the transition layer having conduit shape 59(*b*), while reshaping of each of the resulting three substreams occurs over the progression from shape 59(*c*) to 59(*j*).

Figure 6A:
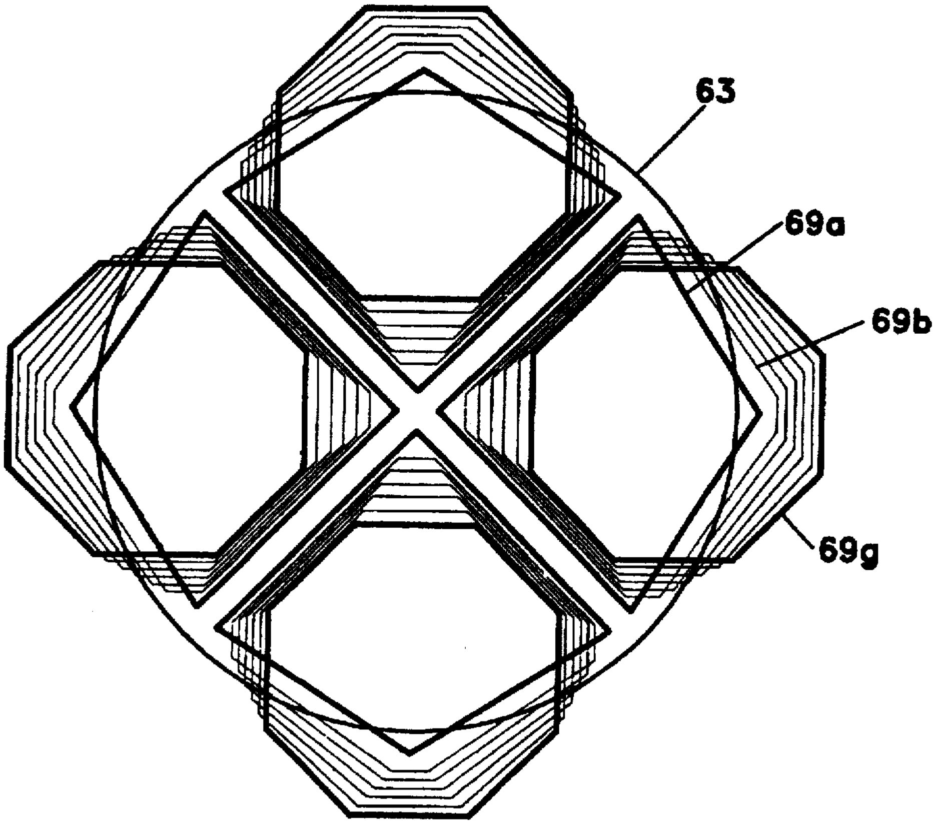
FIGS. 6*a* and 6*b* are schematic plan views of the first and second stages of a compounding transition section conduit for a die of the invention.
Figure 6B:
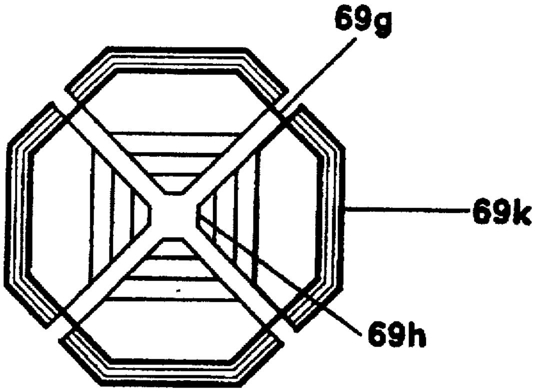

Compounding or subdivision of a stream of extrudable material from a die feedhole can, as previously noted, be carried out multiple times in multiple stages of a single transition section in these dies. A conduit design for two-stage compounding is schematically illustrated in FIGS. 6*a* and 6*b* of the drawing. In FIG. 6*a*, corresponding to the first compounding stage, a feedstream from a circular feedhole 63 is subdivided into four sub-streams in an initial transition layer of conduit shape 69(*a*), and each of the sub-streams is then reshaped over the progression of conduits 69(*b*)–69(*g*) to symmetrical octagonal cross-sectional shape.

In the second compounding stage, shown in FIG. 6*b*, each octagonal sub-stream from the opening 69(*g*) in the first compounding stage of FIG. 6*a* is subdivided in a transition layer with openings of shape 69(*h*) into four smaller sub-streams. Thereafter, each of the smaller sub-streams is reshaped over the progression of conduit openings beginning with conduit shape 69(*i*) and finishing with conduit shape 69(*k*) into elongated stream shapes suitable for evenly supplying extrudable material to the slot segments of a square-celled honeycomb extrusion die. The clear advantage of this multiple compounding approach is that four cells of an extruded honeycomb product can be fully formed from a single feedhole 63 in a die body plate. This greatly reduces the number of feedholes needed for fine-structure honeycomb production.

Uniting the die body plate, transition section plates and discharge section plate of dies such as shown in drawings into a preform for a finished extrusion die according to the invention can be accomplished using conventional metal fastening or joining techniques. In principle, any assembly method including soldering, brazing or even mechanical fastening could be used, but the preferred method of assembly is diffusion bonding. The latter method forms an integral die assembly which readily meets the strength and dimensional targets required of finely structured extrusion dies.

U.S. Pat. No. 3,678,570 to Paulonis et al. describes one suitable diffusion bonding procedure, particularly useful for superalloy and stainless steel bonding, wherein thin alloy interlayers are used to assist the diffusion bonding process through the formation of a transient liquid phase. These interlayers promote good diffusion bonding of similar materials at temperatures and pressures somewhat lower than required for conventional diffusion processes.

The invention is further described by reference to the following Example, which is intended to be illustrative rather than limiting.

EXAMPLE

Components for feed, transition, and discharge sections for a honeycomb extrusion die are first selected. The feed section consists of a die body plate composed of Type 422 PM stainless steel (Type 422 steel consolidated from steel powder). This plate is gun-drilled to provide a feedhole array consisting of about 100 holes/in2 (16 holes/cm2) of plate surface. The surfaces of the plate are then ground and polished to provide a finished body plate with an array of smooth through-holes.

The transition section of the extrusion die is formed from a stack of six thin stainless steel plates. Each plate has a thickness of about 0.010 in (0.250 mm) and is formed of Type 410 stainless steel. The openings in the transition plates are formed by selective etching using conventional photochemical machining techniques. Each plate is machined to provide a hole array wherein the sets of openings are patterned in substantial conformance with a different one of the hole shapes 49*a*–49*f* illustrated in FIG. 4 of the drawing. Plate (a) incorporates holes substantially matching the feedholes in the body plate in number and size, and which are close to the feedholes in shape. This assures easy ingress of feed streams from the connecting feedholes. Plate (b) comprises hole arrays dividing each feed stream into four sub-streams, as in 49*b* of FIG. 4, while plates (c)–(f) successively reshape each of the sub-streams to provide elongated feedstream cross-sections at the outlets from the transition section into the discharge section.

The discharge section of the die is formed from a hardened steel face plate of Type 422 PM stainless steel. The faces of this plate are ground flat and parallel and then a discharge slot array comprising two arrays of parallel slots is cut into one surface of the plate. The arrays intersect each other at a 90° angle and the slots in each array have a uniform slot spacing of 2.5 mm. Thus a uniform array of square "pins" is formed by the slots in the surface of the plate.

The method used to form the slots in the plate surface is abrasive wheel grinding. Thin boron nitride abrasive wheels are used to slot the plate to a depth of 3.81 mm (0.15 in) from the plate surface. The slots are of dual width design, having a width of about 0.36 mm (0.014 in) at the machined surface of the plate and to a depth of about 0.89 mm (0.035 in) from the surface, and having a width of about 0.18 mm (0.007 in) over the bottom 2.92 mm (0.115 in) of slot depth.

The body, transition and discharge face plates thus provided are next assembled into a preform for an extrusion die. The transition plates in (a)–(f) order are stacked on the body plate, these being carefully aligned to insure accurate registry of the feedholes with all of the conduits in the transition plates. The steel faceplate is then positioned on top of the transition plate stack with the machined (slotted) surface of the faceplate in contact with the top transition plate (f) of the transition section. The faceplate is carefully positioned on the stacked transition plates to insure that each of the slot segments in the faceplate is aligned with one of the elongated sub-stream conduit outlets in the top transition plate of the stack.

The die components thus aligned are then bonded together under heat and pressure to provide an integral die preform. The bonding method used is a conventional diffusion bonding procedure utilizing a single layer of NiP bonding alloy plated to a thickness of about 5 µm onto one of the two metal surfaces of each layer pair to be joined. Permanent bonding of all of the layers into an integral preform assembly is the effected by heating the stack to a peak temperature of 1000° C. under a peak pressure of 992 psi (6.84 Mpa). After bonding and cooling, the assembly is subjected to a conventional tempering cycle for 400 series steels.

The bonded preform thus provided is next subjected to a face plate machining step. In this step a layer of material is removed from the exposed surface of the faceplate, the layer removed being of sufficient thickness to expose the tips of the discharge slots machined into the opposite surface of the faceplate. Wire electrical discharge machining is the method used to remove the desired layer of surface material.

Finally, the faceplate with exposed slots is ground and/or polished to smooth the discharge face and other external and internal surfaces of the die. If desired, the die may then be tempered, and/or it may be provided with any of the known wear coatings considered useful for the particular honeycomb extrusion application of interest. Examples of known wear coatings used for the extrusion of abrasive ceramic-powder-based batch materials include titanium nitride, titanium carbide, titanium carbonitride, or the like.

A particular advantage of extrusion dies such as provided in accordance with the foregoing Example is extended service life, especially for the extrusion of plasticized batches containing fine particulate abrasive ceramic materials. Because the feed streams delivered to the outlet section of the die may be reshaped and/or delivered to any arbitrary location, such as, for example, to the pin side surfaces or "mid-slot" portions of the discharge opening, pin wear can be born by the less vulnerable side surfaces rather than the corners of the pin bases. This delays the undesirable changes in pin corner shape which cause product defects such as enlarged wall intersections or so-called "swollen center posts".

The fact that directional and shape changes in the feed streams take place relatively gradually and prior to feed stream delivery to the bases of the pins also reduces die and pin wear and proportionally extends die life. The feedhole/discharge slot misalignments caused by drilling errors during the fabrication of conventional dies are entirely avoided, and feedstream impedance is minimized since the 90° flow stream redirection required at hole/slot interfaces in such conventional dies is no longer required.

A further important advantage of these die designs is the ability to reduce feedhole count in high-cell-count dies, through the use of compound-feed transition sections. Thus, as previously noted, feedstream subdivision within the transition section may be carried out in one, two, or even more stages. In this way a single feedhole in the die body, subdivided into 3 or 4 sub-streams at multiple compounding stages in the transition section could supply extrudable material to 9, 16, or many more slot segments in the outlet section of the die. Such a die is both stronger and less costly than a conventional high-cell-count die, due to the reduced number of feedholes, and may exhibit correspondingly reduced feedhole batch flow impedance as well as lower sensitivity to variations in feedhole roughness.

Finally, these dies offer improved extrusion performance for unusual die configurations, such as rectangular cell dies, which are quite difficult to feed uniformly using conventional feedhole patterns. The ability to provide transition conduits of arbitrary size, shape and number between a conventional feedhole array and a customized discharge slot array provides greatly improved control over the distribution of batch material to discharge sections of such dies, insuring a very flat flow front across the die discharge face and more consistent knitting of the material at cell corners and webs.

We claim:

1. A honeycomb extrusion die comprising:

a feed section having a plurality of feedholes for the input of an extrudable material;

a discharge section terminating on a discharge face, the discharge face comprising a discharge opening for discharging the extrudable material as a channeled honeycomb body; and a transition section disposed between and joined to each of the feed section and the discharge section, the transition section being formed of a stacked plurality of thin metal transition layers and containing a plurality of conduits, formed by successions of openings in the transition layers, the conduits being in at least partial registry with the feedholes and communicating with the discharge opening, for transporting the extrudable material as feed streams between the feed and discharge sections of the die.

2. An extrusion die in accordance with claim 1 wherein:

the feedholes are parallel to a flow axis for the extrudable material;

the transition section comprises an inlet transition layer adjoining the feed section and an outlet transition layer adjoining the discharge section; and in an interval between the inlet transition layer and the outlet transition layer, the conduits (i) divide into branch conduits; (ii) have a direction which is non-parallel with the flow axis; and/or (iii) change in cross-sectional shape.

3. An extrusion die in accordance with claim 2 wherein the conduits divide into branch conduits in the interval.

4. An extrusion die in accordance with claim 3 wherein the conduits or branch conduits have a direction which is non-parallel with the flow axis in the interval.

5. An extrusion die in accordance with claim 3 wherein the conduits or branch conduits change in cross-sectional shape in the interval.

6. An extrusion die in accordance with claim 5 wherein the conduits or branch conduits have a cross-sectional shape changing from a shape with aspect ratio below 2:1 to a shape with aspect ratio greater than 2:1 in the interval.

7. An extrusion die in accordance with claim 3 wherein the conduits divide into two or more branch conduits at a division point in the interval.

8. An extrusion die in accordance with claim 7 wherein the branch conduits change in cross-sectional shape from the division point to the outlet transition layer.

9. An extrusion die in accordance with claim 8 wherein the branch conduits have a cross-sectional shape of aspect ratio below 2:1 at the division point.

10. An extrusion die in accordance with claim 8 wherein the branch conduits have a cross-sectional shape of aspect ratio greater than 2:1 at the outlet transition layer.

11. An extrusion die in accordance with claim 10 wherein the branch conduits have a substantially rectangular cross-section at the outlet transition layer.

12. An extrusion die in accordance with claim 7 wherein the branch conduits divide into smaller branch conduits at a second division point in the interval.

13. An extrusion die in accordance with claim 12 which comprises 3–4 branch conduits and 9–16 smaller branch conduits.

14. An extrusion die in accordance with claim 12 wherein the smaller branch conduits change in cross-sectional shape from the second division point to the outlet face layer.

15. An extrusion die in accordance with claim 14 wherein the conduits divide into two or more branch conduits at the inlet face transition layer.

16. An extrusion die in accordance with claim 5 wherein the conduits or branch conduits are cross-shaped at the outlet face layer.

17. An extrusion die in accordance with claim 1 wherein the transition section comprises at least 4 bonded metal layers, each layer having a layer thickness not exceeding about 1 mm.

18. An extrusion die in accordance with claim 1 wherein the transition section comprises 5–50 transition layers.

19. An extrusion die in accordance with claim 1 wherein the transition layers are 125–500 μm in thickness.

20. An extrusion die in accordance with claim 2 wherein:

the discharge section comprises an array of pins, each pin (i) being bonded at an attachment end to the outlet face transition layer, (ii) terminating at an outer end on the discharge face, and (iii) being separated by interstitial spaces from adjacent pins, and the discharge opening is formed by the interstitial spaces.

21. An extrusion die in accordance with claim 20 wherein the pins have a smaller cross-section at the attachment end than at the outer end.

22. An extrusion die in accordance with claim 20 wherein the pins have cross-sectional shapes at the discharge face selected from the group consisting of closed-curved shapes, triangular shapes, quadrilateral shapes, and hexagonal shapes.

23. An extrusion die in accordance with claim 20 wherein the discharge opening is formed by an array of criss-crossing discharge slots forming the interstitial spaces between the pins.

24. An extrusion die in accordance with claim 2 wherein the feedholes are of circular cross-section.

25. A method for extruding a honeycomb product which comprises:

(i) introducing an extrudable material as a plurality of feed streams into a plurality of feedholes extending into a feed section of a honeycomb extrusion die;

(ii) delivering the feed streams from the feedholes into a multilayer metal transition section adjacent the feed section, the transition section comprising a plurality of conduits having openings in at least partial registry with the feedholes for conveyance of the feed streams;

(iii) redirecting, reshaping and/or dividing the feed streams within the conduits in the transition section to provide a plurality of redirected, reshaped and/or divided feed streams of extrudable material;

(iv) delivering the redirected, divided and/or reshaped feed streams from the transition section into a discharge section adjacent the transition section, the discharge section comprising a discharge opening connecting with the conduits and configured to discharge the extrudable material as a channeled honeycomb body; and (v) discharging the extrudable material from the discharge opening as a honeycomb product.

26. A method in accordance with claim 25 wherein:

the feed streams traverse the feedholes along a flow axis, and the feed streams are redirected, in at least portions of the conduits, along flow paths diverging directionally from the flow axis.

27. A method in accordance with claim 26 wherein the flow paths diverge directionally from the flow axis by angles not exceeding about 30°.

28. A method in accordance with claim 25 wherein:

the feed streams are divided in the conduits to form divided feed streams, and the divided feed streams are delivered into the discharge section.

29. A method in accordance with claim 28 wherein the divided feed streams are re-divided prior to delivery into the discharge section.

30. A method in accordance with claim 25 wherein the feed streams have a cross-sectional shape of aspect ratio below 2:1 as delivered into the transition section, and a cross-sectional shape of aspect ratio above 2:1 as delivered to the discharge section.

31. A method in accordance with claim 28 wherein the feed streams have a cross-sectional shape of aspect ratio below 2:1 as delivered into the transition section, and wherein the divided feed streams have a cross-sectional shape of aspect ratio above 2:1 as delivered to the discharge section.

32. A method in accordance with claim 29 wherein the feed streams have a cross-sectional shape of aspect ratio below 2:1 as delivered into the transition section, and wherein the re-divided feed streams have a cross-sectional shape of aspect ratio above 2:1 as delivered to the discharge section.

33. A method in accordance with claim 28 wherein the feed streams are divided into 2 or more divided feed streams in the conduits.

34. A method in accordance with claim 23 wherein the divided feed streams are re-divided into 2 or more re-divided feed streams in the conduits.

35. A method in accordance with claim 23 wherein the flow axis for the extrudable material within the transition section does not depart from the longitudinal direction of batch flow through the feedholes by an angle greater than about 30 degrees.

36. A method for making a honeycomb extrusion die which comprises the steps of:

forming a plurality of feedholes in a die body plate;

forming an array of openings in each of a plurality of thin transition plates;

stacking the thin transition plates to form a plate stack comprising a base transition plate and a terminating transition plate wherein the openings in each plate are in at least partial registry with the openings in adjacent plates in the plate stack, and wherein the arrays of openings form an array of conduits through the plate stack;

positioning the base transition plate of the plate stack against the die body plate so that the feedholes are in at least partial registry with the conduits;

positioning a die discharge section against the terminating transition plate of the plate stack; and joining the die body plate, plate stack and die discharge section together to form an extrusion die preform.

37. A method in accordance with claim 36 wherein the die body plate, plate stack and die discharge section are formed of stainless steel and are joined together by diffusion bonding.

38. A method in accordance with claim 36 wherein the die body plate, plate stack and die discharge section are joined together by brazing.

39. A method in accordance with claim 36 wherein the plurality of transition plates comprises 5–50 plates, and wherein each plate has a thickness in the range of 125–500 μm.

40. A method in accordance with claim 36 wherein the die discharge section comprises a flat metal faceplate, and wherein the faceplate is machined to provide a discharge opening communicating with the conduits in the transition section after the faceplate has been joined to the plate stack.

41. A method in accordance with claim 40 wherein the discharge opening comprises an array of criss-crossing discharge slots.

42. A method in accordance with claim 41 wherein the discharge slots are formed by abrasive wheel grinding.

* * * * *